United States Patent
Liu et al.

(10) Patent No.: US 11,628,432 B2
(45) Date of Patent: Apr. 18, 2023

(54) NITROGEN-DOPED MESOPOROUS CARBON-COATED TITANIUM DIOXIDE COMPOSITE PHOTOCATALYST, A PREPARATION METHOD AND USE THEREOF

(71) Applicant: Guangdong University of Technology, Guangzhou (CN)

(72) Inventors: Hongli Liu, Guangzhou (CN); Yaping Ma, Guangzhou (CN); Taicheng An, Guangzhou (CN); Guiying Li, Guangzhou (CN); Jiangyao Chen, Guangzhou (CN)

(73) Assignee: GUANGDONG UNIVERSITY OF TECHNOLOGY, Guangdong (CN)

(*) Notice: Subject to any disclaimer, the term of this patent is extended or adjusted under 35 U.S.C. 154(b) by 330 days.

(21) Appl. No.: 16/640,947

(22) PCT Filed: Apr. 13, 2018

(86) PCT No.: PCT/CN2018/082910
§ 371 (c)(1),
(2) Date: Feb. 21, 2020

(87) PCT Pub. No.: WO2019/052167
PCT Pub. Date: Mar. 21, 2019

(65) Prior Publication Data
US 2021/0121864 A1    Apr. 29, 2021

(30) Foreign Application Priority Data

Sep. 15, 2017 (CN) .......................... 201710830931.8

(51) Int. Cl.
*B01J 35/00* (2006.01)
*B01D 53/86* (2006.01)
(Continued)

(52) U.S. Cl.
CPC ........ *B01J 35/004* (2013.01); *B01D 53/8668* (2013.01); *B01J 21/063* (2013.01);
(Continued)

(58) Field of Classification Search
None
See application file for complete search history.

(56) References Cited

U.S. PATENT DOCUMENTS

2015/0166431 A1* 6/2015 Lippmann .............. C10G 11/18
502/328

FOREIGN PATENT DOCUMENTS

CN    104638219 A * 5/2015
CN    105316797 A   2/2016
(Continued)

OTHER PUBLICATIONS

Tan et al, Nitrogen-Doped Mesoporous Carbon-Encapsulated MoO2 Nanobelts as a High-Capacity and Stable Host for Lithium-Ion Storage, Nov. 2016, chem. asianj, 12, pp. 36-40 (Year: 2016).*
(Continued)

*Primary Examiner* — Stefanie J Cohen
(74) *Attorney, Agent, or Firm* — The Dobrusin Law Firm, P.C.

(57) ABSTRACT

The invention discloses a nitrogen-doped mesoporous carbon-coated Titanium dioxide composite photocatalyst, a preparation method and use thereof. The preparation method comprises the steps of: dissolving an organic ligand and $Ti(OC_3H_7)_4$ in a mixture of methanol and DMF at a certain ratio, performing a hydrothermal reaction, centrifuging and drying to obtain a Titanium-based metal organic framework (Ti-MOF); pyrolyzing the obtained Ti-MOF under an inert atmosphere, and oxidizing the same for etching to obtain a nitrogen-doped mesoporous carbon-coated Titanium dioxide composite photocatalyst. The obtained composite pho-
(Continued)

tocatalyst not only facilitates the adsorption, enrichment and mass transfer of low concentration VOCs, but also efficiently degrades VOCs under sunlight. It has high degradation activity and stability when performing photocatalytic removal of VOCs in the presence of visible light, is simple in synthesis, low in preparation cost, and has strong potential for the use in environmental protection.

7 Claims, 2 Drawing Sheets

(51) Int. Cl.
    *B01J 21/06*      (2006.01)
    *B01J 27/20*      (2006.01)
    *B01J 27/24*      (2006.01)
    *B01J 37/06*      (2006.01)
    *B01J 37/08*      (2006.01)
    *B01J 37/12*      (2006.01)

(52) U.S. Cl.
    CPC ............... *B01J 27/20* (2013.01); *B01J 27/24* (2013.01); *B01J 37/06* (2013.01); *B01J 37/086* (2013.01); *B01J 37/12* (2013.01); *B01D 2255/20707* (2013.01); *B01D 2255/802* (2013.01); *B01D 2257/708* (2013.01); *B01D 2257/7027* (2013.01)

(56) References Cited

FOREIGN PATENT DOCUMENTS

| CN | 105321719 | A | * | 2/2016 | |
| CN | 107117648 | A | * | 9/2017 | ........... C01G 23/005 |
| CN | 107824210 | A | | 3/2018 | |

OTHER PUBLICATIONS

Xu et al, Ultrathin N-doped carbon coated TiO2 coaxial nanofibers as anodes for lithium ion batteries, Mar. 2017, journal of the american ceramic society, pp. 2939-2947 (Year: 2017).*
CN-104638219-A, English translation (Year: 2015).*
CN-105321719-A—English translation (Year: 2016).*
CN-107117648-A—English translation (Year: 2017).*
Yifan Gu, ACS Sustainable Chemistry & Engineering, "Metal-Organic Framework-Templated Sythesis of Bifunctional N-Doped TiO$_2$-Carbon Nanotablets via Solid-State Thermolysis", 6744-6753, 2016.
Search Report dated Jun. 27, 2018, Application No. PCT/CN2018/082910.

* cited by examiner

NITROGEN-DOPED MESOPOROUS CARBON-COATED TITANIUM DIOXIDE COMPOSITE PHOTOCATALYST, A PREPARATION METHOD AND USE THEREOF

This application claims priority to China Patent Application No. CN 201710830931.8 named "A nitrogen-doped mesoporous carbon-coated Titanium dioxide composite photocatalyst, a preparation method and use thereof" filed Sep. 15, 2017 and hereby incorporated by reference in its entirety.

TECHNICAL FIELD

The invention belongs to the technical field of adsorption type photocatalytic material, and more specifically, relates to a nitrogen-doped mesoporous carbon-coated Titanium dioxide composite photocatalyst, a preparation method and use thereof.

BACKGROUND ART

Volatile Organic Compounds (VOCs) are an important source of air pollution and have caused different degrees of pollution to indoor environment and atmosphere, which seriously affects human health and ecological environment. How to provide effective and technological methods to remove VOCs in the atmosphere has become the focus of researchers in environmental protection. Photocatalytic oxidation is a new technology for controlling environmental pollution. It has the advantages of simple process, low initial investment and low equipment maintenance cost, and may hopefully oxidize VOCs to $CO_2$ and $H_2O$. Therefore, it has bright application prospects in the removal of VOCs, especially low concentration VOCs. So far, various semiconductor photocatalysts have been developed and used, among which Titanium dioxide ($TiO_2$) has attracted wide attention of researchers due to its excellent photocatalytic oxidation performance, anti-light corrosion, non-toxicity and low cost. However, since $TiO_2$ has a wide band gap (Eg=3.0 to 3.2 eV), photocatalytic reaction can only occur when it is excited by ultraviolet light. However, the ultraviolet energy accounts for less than 5% of the sunlight, and visible light accounting for 43% of the sunlight energy cannot be effectively utilized, which greatly limits its application in environmental purification. In addition, since $TiO_2$ has a small specific surface area which makes it impossible to effectively adsorb low concentration VOCs in the real atmosphere, thereby significantly reducing the efficiency of photocatalytic oxidation. Therefore, broadening the photoresponse range of $TiO_2$ material and enhancing its adsorption performance is important for improvement of its photocatalytic activity.

In order to better improve the catalytic activity, domestic and foreign scholars have conducted a large number of modifications on $TiO_2$ by the following methods: compounding $TiO_2$ with large surface area materials to improve its adsorption and enrichment ability for VOCs; narrowing the band gap, expanding the photoresponse range, so that it can exhibit photocatalytic property in visible region; adding trapping agent to prevent or slow down the recombination of photogenerated electron and hole, improve photon efficiency, and improve stability of the photocatalytic material, etc. However, most of the modifications are difficult to simultaneously improve the utilization rate of solar energy and photocatalytic activity. Therefore, how to prepare a stable and efficient photocatalyst driven by sunlight which has enhanced absorption and utilization rate of sunlight, and improved photocatalytic efficiency and stability is an urgent problem to be solved.

Up to now, no researches and reports on the preparation of nitrogen-doped mesoporous carbon-coated $TiO_2$ composite photocatalysts and their VOCs degradation ability have been seen.

SUMMARY OF THE INVENTION

The object of the present invention is to overcome the defects of the prior art and provide a method for preparing a nitrogen-doped mesoporous carbon-coated $TiO_2$ composite photocatalyst (mesoporous $TiO_2$@NC). The method uses a Titanium-based MOF material containing an amino group as a sacrificial template, and utilizes the thermal instability of MOF to prepare a nitrogen-doped mesoporous carbon-coated $TiO_2$ composite by high temperature pyrolysis and oxidative etching.

Another object of the present invention is to provide a nitrogen-doped mesoporous carbon-coated $TiO_2$ composite photocatalyst prepared by the above method. The material can exhibit greatly improved catalytic activity under sunlight, which solves the problem of low utilization rate of sunlight, and low adsorptivity of low concentration VOCs that reduces the photocatalytic degradation efficiency in the case of degrading VOCs in real atmosphere when $TiO_2$ is used as a photocatalyst.

Another object of the present invention is to provide a use of the above nitrogen-doped mesoporous carbon-coated $TiO_2$ composite photocatalyst.

The above object of the present invention is achieved by the following technical solutions:

A method for preparing a nitrogen-doped mesoporous carbon-coated Titanium dioxide composite photocatalyst comprises the steps of:

S1. mixing an organic ligand, $Ti(OC_3H_7)_4$, methanol and DMF into a reaction vessel with polytetrafluoroethylene;

S2. placing the reaction vessel containing the mixed solution in S1 in an oven, rising the temperature to 120-160° C., maintaining this temperature for 24-72 hours, and then cooling to room temperature to obtain a precipitate;

S3. cross washing the precipitate obtained in S2 with an alcohol and DMF, centrifuging, and drying under vacuum to obtain an activated Titanium-based MOF material;

S4. heating the activated Titanium-based MOF material obtained in S3 to 500-800° C. in an inert gas atmosphere and maintaining the temperature for 2-12 h; after lowering the temperature to 300-500° C., replacing the inert gas with a weak oxidizing gas; maintaining the condition for 0-120 min, adjusting the atmosphere back to the original inert gas atmosphere and the temperature to room temperature, so as to prepare a nitrogen-doped mesoporous carbon-coated $TiO_2$ composite photocatalyst.

Preferably, the organic ligand in S1 is a mixture of 2-aminoterephthalic acid and terephthalic acid or 2-aminoterephthalic acid alone.

Preferably, the molar ratio of the organic ligand, $Ti(OC_3H_7)_4$, methanol and DMF in S1 is 3:2:(23-25):(118-120).

Preferably, the rate of said rising temperature in S2 is 0.1-10° C./min.

Preferably, the alcohol in S3 is methanol or ethanol.

Preferably, said drying under vacuum in S3 is carried out under 100-170° C. for 8-24 h.

Preferably, the inert gas in S4 is Ar or $N_2$, and the weak oxidizing gas is $CO_2$ or air; the rate of said heating is 1-10° C./min, and the rate of said lowering temperature is 1-10° C./min.

A nitrogen-doped mesoporous carbon-coated Titanium dioxide composite photocatalyst is prepared by the above methods.

The nitrogen-doped mesoporous carbon-coated Titanium dioxide composite photocatalyst is used in degrading VOC in the atmosphere under sunlight.

Preferably, the VOC is styrene.

The method uses a Titanium-based MOF material containing an amino group as a sacrificial template, and utilizes the thermal instability of MOF to prepare a nitrogen-doped mesoporous carbon-coated $TiO_2$ composite by high temperature pyrolysis and oxidative etching. The composite photocatalyst can efficiently degrade low concentration VOCs under sunlight, and has improved stability. This is because during the pyrolysis process, the nitrogen in the amino group-containing Titanium-based MOF can effectively be incorporated into $TiO_2$, and the resulting N doping can successfully extend the photoresponse range of $TiO_2$ from ultraviolet region to visible region; at the same time, a certain amount of weak oxidizing gas is introduced during the pyrolysis process, and the carbon formed by pyrolysis can be partially etched to form mesopores to improve the pore volume and specific surface area, which is favorable for adsorption and enrichment of low concentration VOCs. Moreover, due to the good electron transporting ability of the outer porous carbon, the migration of photogenerated electrons is facilitated, and the separation efficiency of the photogenerated electron and hole can be effectively improved, thereby improving the photocatalytic reaction efficiency and the stability of the photocatalyst.

Compared with the prior art, the present invention has the following benefits:

1. The invention uses a Titanium-based MOF material containing an amino group as a sacrificial template, and utilizes the thermal instability of MOF to prepare a nitrogen-doped mesoporous carbon-coated $TiO_2$ composite by high temperature pyrolysis and oxidative etching. The method increases the specific surface area of $TiO_2$ while doping nitrogen into mesoporous carbon-coated $TiO_2$, solves the problem of low utilization rate of sunlight, and photocatalysis of low concentration VOCs when $TiO_2$ is used as a photocatalyst, and greatly improves the catalytic activity and stability thereof.

2. The nitrogen-doped mesoporous carbon-coated $TiO_2$ composite photocatalyst prepared by the present invention increases the photoresponse range of $TiO_2$ due to the N doping, thereby improving the separation of photogenerated carriers. Meantime, weakly oxidizing gas etches the carbon to increase the pore volume and specific surface area thereof, providing the catalyst the advantages of stable and efficient solar photocatalytic degradation of VOCs.

3. The nitrogen-doped mesoporous carbon-coated $TiO_2$ composite photocatalyst prepared by the invention has good adsorption and photocatalytic activity for typical VOCs like styrene, and has short adsorption time and high degradation efficiency. The adsorption rate of styrene by mesoporous $TiO_2$@NC may reach 91.7% in 60 min, and the degradation rate of gas phase styrene may reach 74.5% within 80 min, which realizes the integration of adsorption and photocatalytic oxidation of VOCs.

DETAILED EMBODIMENT

The contents of the present invention are further described below in conjunction with the specific embodiments, but are not to be construed as limitation of the invention. The technical means used in the examples are not conventionally known to those skilled in the art, unless otherwise specified. Unless otherwise indicated, the reagents, methods, and devices employed in the present invention are routine reagents, methods, and devices in the art.

Example 1

1. Preparation of Photocatalytic Material

S1. Mix 2-aminoterephthalic acid, $Ti(OC_3H_7)_4$, methanol and DMF at a molar ratio of 3:2:23:118 and add them to a reaction vessel with polytetrafluoroethylene;

S2. Place the reactor in an oven, set the program, raise the temperature to 150° C. at a rate of 1° C./min, then maintain the temperature for 48 h, finally cool down at a rate of 5° C./h down to room temperature to obtain a precipitate;

S3. Cross wash the precipitate obtained in S2 with methanol and DMF, conduct centrifugation and vacuum drying at 150° C. for 12 h to obtain an activated Titanium-based MOF material;

S4. Place the activated Titanium-based MOF material prepared in S3 in a tube furnace, raise the temperature from room temperature to 600° C. at a rate of 1° C./min under Ar atmosphere, and maintain this temperature for 6 h; then, lower the temperature to 500° C. at a rate of 1° C./min and keep it for 30 min, during which Ar is replaced with $CO_2$; finally, adjust the atmosphere back to Ar atmosphere, and reduce the temperature to room temperature at a rate of 1° C./min to obtain a nitrogen-doped mesoporous carbon-coated $TiO_2$ composite photocatalyst.

Figure 1:
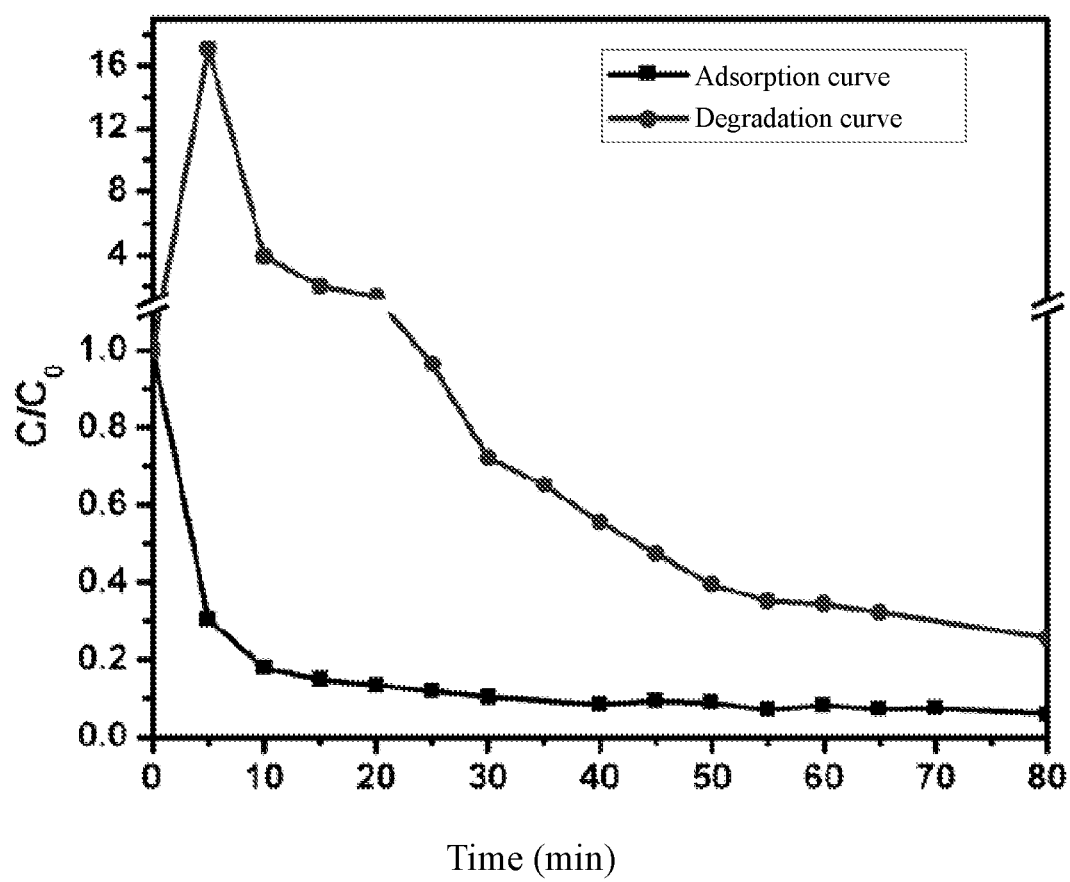
FIG. 1 is a kinetic curve of adsorption and photocatalytic degradation of gas phase styrene by a nitrogen-doped mesoporous carbon-coated $TiO_2$ ($TiO_2$@NC) composite photocatalyst in Example 1.
Figure 2:
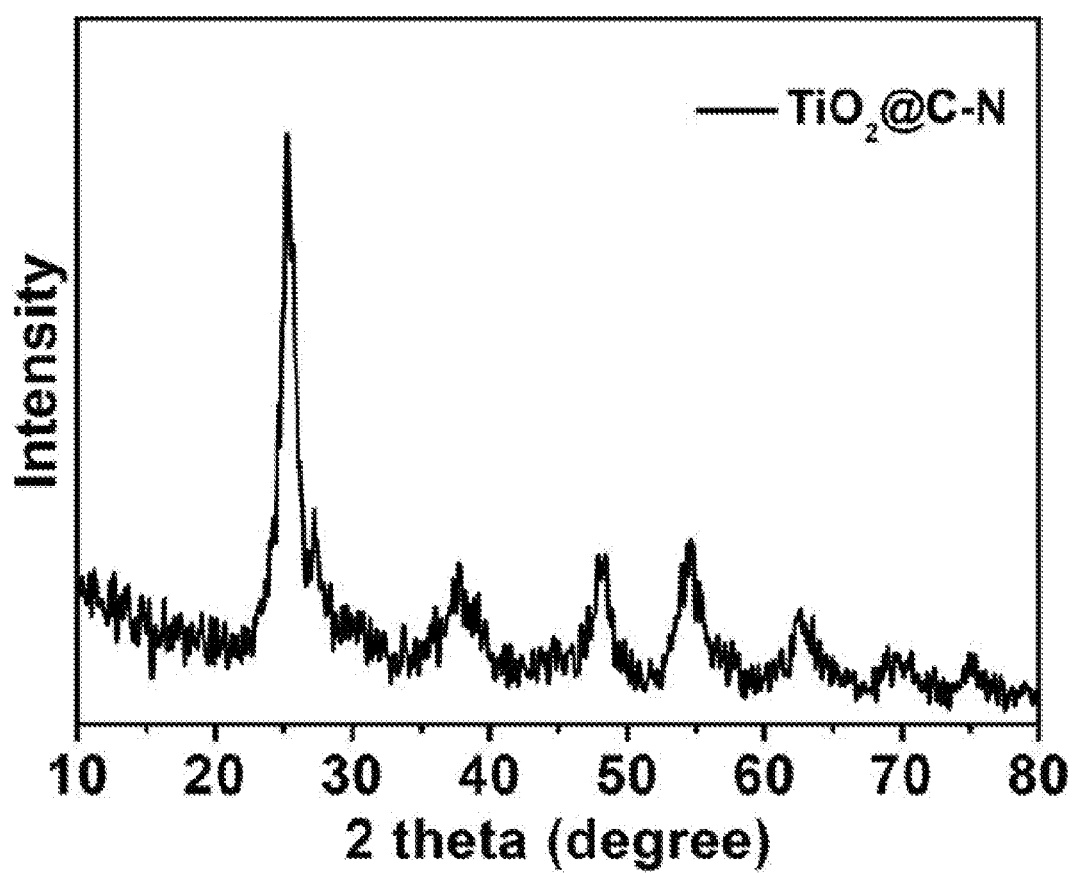
FIG. 2 is an XRD pattern of TiO2@C—N showing various characteristic peaks at 2θ.

2. Performance Test:

FIG. 1 is a kinetic curve of adsorption and photocatalytic degradation of gas phase styrene by a nitrogen-doped mesoporous carbon-coated $TiO_2$ composite photocatalyst according to the present example. It can be seen from FIG. 1 that the adsorption rate of styrene reaches 91.7% within 60 min, and the degradation rate of gas phase styrene reaches 74.5% within 80 min. The results show that the photocatalyst has good adsorption and photocatalytic activity, and the one treated by weak oxidizing gas exhibits better effect. The nitrogen-doped mesoporous carbon-coated $TiO_2$ composite photocatalyst prepared by the invention is a novel material with high adsorption and photocatalytic activity.

Example 2

S1. Mix 2-aminoterephthalic acid, $Ti(OC_3H_7)_4$, methanol and DMF at a molar ratio of 3:2:23:118 and add them to a reaction vessel with polytetrafluoroethylene;

S2. Place the reactor in an oven, set the program, raise the temperature to 150° C. at a rate of 5° C./min, then maintain the temperature for 72 h, finally cool down at a rate of 5° C./h down to room temperature to obtain a precipitate;

S3. Cross wash the precipitate obtained in S2 with methanol and DMF, conduct centrifugation and vacuum drying at 120° C. for 24 h to obtain an activated Titanium-based MOF material;

S4. Place the activated Titanium-based MOF material prepared in S3 in a tube furnace, raise the temperature from room temperature to 700° C. at a rate of 2° C./min under Ar atmosphere, and maintain this temperature for 7 h; then, lower the temperature to room temperature at a rate of 2° C./min to obtain a nitrogen-doped mesoporous carbon-coated $TiO_2$ composite photocatalyst.

Example 3

S1. Mix 2-aminoterephthalic acid, $Ti(OC_3H_7)_4$, methanol and DMF at a molar ratio of 3:2:23:118 and add them to a reaction vessel with polytetrafluoroethylene;

S2. Place the reactor in an oven, set the program, raise the temperature to 150° C. at a rate of 1° C./min, then maintain the temperature for 48 h, finally cool down at a rate of 5° C./h down to room temperature to obtain a precipitate;

S3. Cross wash the precipitate obtained in S2 with methanol and DMF, conduct centrifugation and vacuum drying at 150° C. for 8 h to obtain an activated Titanium-based MOF material;

S4. Place the activated Titanium-based MOF material prepared in S3 in a tube furnace, raise the temperature from room temperature to 500° C. at a rate of 3° C./min under Ar atmosphere, and maintain this temperature for 9 h; then, lower the temperature to 300° C. at a rate of 3° C./min and keep it for 60 min, during which Ar is replaced with $CO_2$; finally, adjust the atmosphere back to Ar atmosphere, and reduce the temperature to room temperature at a rate of 3° C./min to obtain a nitrogen-doped mesoporous carbon-coated $TiO_2$ composite photocatalyst.

Example 4

S1. Mix 2-aminoterephthalic acid, $Ti(OC_3H_7)_4$, methanol and DMF at a molar ratio of 3:2:25:120 and add them to the reaction vessel with polytetrafluoroethylene;

S2. Place the reactor in an oven, set the program, raise the temperature to 160° C. at a rate of 10° C./min, then maintain the temperature for 24 h, finally cool down at a rate of 5° C./h down to room temperature to obtain a precipitate;

S3. Cross wash the precipitate obtained in S2 with methanol and DMF, conduct centrifugation and vacuum drying at 150° C. for 20 h to obtain an activated Titanium-based MOF material;

S4. Place the activated Titanium-based MOF material prepared in S3 in a tube furnace, raise the temperature from room temperature to 800° C. at a rate of 10° C./min under nitrogen atmosphere, and maintain this temperature for 2 h; then, lower the temperature to 500° C. at a rate of 5° C./min and keep it for 90 min, during which nitrogen is replaced with $CO_2$; finally, adjust the atmosphere back to nitrogen atmosphere, and reduce the temperature to room temperature at a rate of 5° C./min to obtain a nitrogen-doped mesoporous carbon-coated $TiO_2$ composite photocatalyst.

Example 5

S1. Mix 2-aminoterephthalic acid, $Ti(OC_3H_7)_4$, methanol and DMF at a molar ratio of 3:2:25:120 and add them to the reaction vessel with polytetrafluoroethylene;

S2. Place the reactor in an oven, set the program, raise the temperature to 120° C. at a rate of 0.1° C./min, then maintain the temperature for 72 h, finally cool down at a rate of 5° C./h down to room temperature to obtain a precipitate;

S3. Cross wash the precipitate obtained in S2 with methanol and DMF, conduct centrifugation and vacuum drying at 170° C. for 16 h to obtain an activated Titanium-based MOF material;

S4. Place the activated Titanium-based MOF material prepared in S3 in a tube furnace, raise the temperature from room temperature to 600° C. at a rate of 2° C./min under Ar atmosphere, and maintain this temperature for 12 h; then, lower the temperature to 500° C. at a rate of 2° C./min and keep it for 120 min, during which Ar is replaced with $CO_2$; finally, adjust the atmosphere back to Ar atmosphere, and reduce the temperature to room temperature at a rate of 10° C./min to obtain a nitrogen-doped mesoporous carbon-coated $TiO_2$ composite photocatalyst.

Example 6

S1. Mix 2-aminoterephthalic acid, $Ti(OC_3H_7)_4$, methanol and DMF at a molar ratio of 3:2:25:120 and add them to the reaction vessel with polytetrafluoroethylene;

S2. Place the reactor in an oven, set the program, raise the temperature to 120° C. at a rate of 1° C./min, then maintain the temperature for 72 h, finally cool down at a rate of 5° C./h down to room temperature to obtain a precipitate;

S3. Cross wash the precipitate obtained in S2 with methanol and DMF, conduct centrifugation and vacuum drying at 150° C. for 8 h to obtain an activated Titanium-based MOF material;

S4. Place the activated Titanium-based MOF material prepared in S3 in a tube furnace, raise the temperature from room temperature to 600° C. at a rate of 2° C./min under Ar atmosphere, and maintain this temperature for 5 h; then, lower the temperature to 300° C. at a rate of 2° C./min and keep it for 30 min, during which nitrogen is replaced with air; finally, adjust the atmosphere back to nitrogen atmosphere, and reduce the temperature to room temperature at a rate of 5° C./min to obtain a nitrogen-doped mesoporous carbon-coated $TiO_2$ composite photocatalyst.

The above embodiments are preferred embodiments of the present invention, but the embodiments of the present invention are not limited thereto, and any other changes, modifications, substitutions, combinations, combinations and simplification made thereof made without departing from the spirit and scope of the invention should all be equivalent replacements and are included in the scope of the present invention.

What is claimed is:

1. A method for preparing a nitrogen-doped mesoporous carbon-coated Titanium dioxide composite photocatalyst, characterized in that it comprises the steps of:

S1. mixing an organic ligand, $Ti(OC_3H_7)_4$, methanol and DMF into a reaction vessel with polytetrafluoroethylene;

S2. placing the reaction vessel containing the mixed solution in S1 in an oven, rising the temperature to 120-160° C., maintaining this temperature for 24-72 hours, and then cooling to room temperature to obtain a precipitate;

S3. cross washing the precipitate obtained in S2 with an alcohol and DMF, centrifuging, and drying under vacuum to obtain an activated Titanium-based MOF material;

S4. heating the activated Titanium-based MOF material obtained in S3 to 500-800° C. in an inert gas atmosphere and maintaining the temperature for 2-12 h;

after lowering the temperature to 300-500° C., replacing the inert gas with a weak oxidizing gas; maintaining the condition for 30-120 min, adjusting the atmosphere back to the original inert gas atmosphere and the temperature to room temperature, so as to prepare a nitrogen-doped mesoporous carbon-coated $TiO_2$ composite photocatalyst.

2. The method for preparing a nitrogen-doped mesoporous carbon-coated Titanium dioxide composite photocatalyst according to claim 1, characterized in that the organic ligand in S1 is a mixture of 2-aminoterephthalic acid and terephthalic acid or 2-aminoterephthalic acid alone.

3. The method for preparing a nitrogen-doped mesoporous carbon-coated Titanium dioxide composite photocatalyst according to claim 1, characterized in that the molar ratio of the organic ligand, $Ti(OC_3H_7)_4$, methanol and DMF in S1 is 3:2: (23-25): (118-120).

4. The method for preparing a nitrogen-doped mesoporous carbon-coated Titanium dioxide composite photocatalyst according to claim 1, characterized in that the rate of said rising temperature in S2 is 0.1-10° C/min.

5. The method for preparing a nitrogen-doped mesoporous carbon-coated Titanium dioxide composite photocatalyst according to claim 1, characterized in that the alcohol in S3 is methanol or ethanol.

6. The method for preparing a nitrogen-doped mesoporous carbon-coated Titanium dioxide composite photocatalyst according to claim 1, characterized in that said drying under vacuum in S3 is carried out under 100-170° C. for 8-24 h.

7. The method for preparing a nitrogen-doped mesoporous carbon-coated Titanium dioxide composite photocatalyst according to claim 1, characterized in that the inert gas in S4 is Ar or $N_2$, and the weak oxidizing gas is $CO_2$ or air; the rate of said heating is 1-10° C/min, and the rate of said lowering temperature is 1-10° C/min.

* * * * *